Patented Dec. 17, 1940

2,224,944

UNITED STATES PATENT OFFICE 2,224,944

THERMALLY STABLE COATING COMPOSITION FROM VINYLIDENE CHLORIDE RESINS

George H. Young, Pittsburgh, Pa., assignor to Stoner-Mudge, Inc., a corporation of Pennsylvania No Drawing. Application January 19, 1939, Serial No. 251,707

6 Claims. (Cl. 260—80)

This invention relates to a coating compound, capable of forming protective coatings upon the surfaces of other bodies, and relates specifically to a coating compound that consists primarily of those resinous polymeric compounds resulting from the polymerization of vinylidene chloride, alone or conjointly with vinyl chloride, vinyl bromide, vinyl iodide, vinyl fluoride, styrene and its nuclear substituted derivatives, with vinyl acetate and other lower aliphatic esters of vinyl alcohol, with vinyl alcohol itself, with methyl methacrylate, and other lower alkyl esters of methacrylic acid or of acrylic acid. In all of the above polymers and conjoint polymers it will be understood that the vinylidene chloride will ordinarily, though not necessarily, be present in the greater proportion. These polymers may be generally referred to as polyvinylidene chlorides, and by this term I mean to include any or all of the resinous polymers and copolymers described above.

Vinylidene chloride is a chemical compound corresponding to the formula $CH_2=C(Cl)_2$; it may be derived, for example, from methyl chloroform ($CH_3—C(Cl)_3$) by the action of a suitable base, and from vinyl trichloride ($Cl_2CH—CH_2Cl$) by the action of a base, as is well known. In the resinous products contemplated in this invention, vinylidene chloride derived by these illustrative processes, or by any other process, has been shown to serve equally well and its use in thermoplastic polymers is not new. A typical polymer consisting essentially of polyvinylidene chloride is to be had on the market under the trade name of Venaloy. Similarly, vinyl acetate, vinyl propionate, styrene, methyl methacrylate, ethyl acrylate, and vinyl chloride—to name several of the available compounds which can conjointly polymerize with vinylidene chloride—are well-known chemical compounds and their use in thermoplastic polymers and conjoint polymers is not new.

Summarizing, the polymers and conjoint polymers contemplated in my invention are those derived from the polymerization of vinylidene chloride either alone or conjointly with one or more compounds selected from a group which consists of the vinyl halides (of which vinyl chloride is typical), the lower aliphatic esters of vinyl alcohol (of which vinyl acetate is typical), the lower aliphatic esters of methacrylic and acrylic acids (of which methyl methacrylate and ethyl acrylate are typical), and styrene together with its nuclear substituted chlorine derivatives (of which styrene and meta chlorstyrene are typical). Such polymerization or conjoint polymerization may have been carried out in the presence or absence of catalysts, with or without the action of actinic light, and at normal, reduced, or elevated temperatures and pressures. The resulting polymers or conjoint polymers, suitably dispersed in the usual ketone, poly ether or lower ester solvents, thinned with the usual aromatic diluents, and containing varying proportions of added plasticizers of the phthalate, phosphate, citrate, sebacate, or succinate ester types, are the resinous coating compositions which my invention contemplates.

My invention consists in the addition to the resinous compounds described above, of a substance which will serve to impart thermal stability to a film consisting primarily of these compounds. For example, a normal polymeric vinylidene chloride film deposited upon metal tends to decompose at relatively low temperatures if it is as heavy as is usual for films of this nature, exceeding 3–5 milligrams per square inch. While the specific decomposition temperatures vary somewhat from metal to metal, for ferrous metals and other active metals they generally lie below 300° F., and in the case of tinplate, which is widely used in the coated condition, this temperature of decomposition is only 260° F.

In general it is therefore necessary so to adjust the baking temperatures for a coating composition containing these thermally unstable polymers that the decomposition temperature shall not be exceeded. It will be obvious that this may require special adjustment of baking or force-drying equipment, depending upon the metal which is being coated at a particular time. Furthermore, in baking a coated metal object which itself is constructed from a plurality of metals, the baking temperature which may be correctly adjusted for one of the metals, may result in the coating becoming decomposed over another part of the object, or the coating may adhere insufficiently to some other part of the metal object because it has not been sufficiently baked on that part. Thus a serious limitation is seen to exist in those coating compositions which contain thermally unstable polymers, as is well known. Furthermore, it is frequently true that the temperature at which maximum adhesion to the metal develops may lie above the temperature at which thermal decomposition takes place. For such reasons the practical use of coatings containing thermally unstable resins is limited.

It is, therefore, a matter of desirability, and specifically my object herein, so to increase the thermal stability of the resinous polymeric vinylidene chloride film that, as applied to such metals, or to other metals and materials, it will endure temperatures substantially higher than those noted without undergoing decomposition.

In U. S. Patent 2,130,924, of which I am a co-inventor, there was described a type of thermal stabilizers for the resinous polymers and copolymers derived from vinyl chloride and vinyl esters known commercially as "Vinylite." Generally stated, the resin-type substance with which we there were concerned consisted of any polymer, co-polymer, or polymeric mixture of compounds corresponding to the formula $CH_2=CHX$, in which X may be a halogen, the hydroxyl group, acetoxyl, propionoxyl, or in general any mono-carboxylic acyloxyl group. And, specifically, we found suited to our purpose those resinous products resulting from the simultaneous polymerization of vinyl chloride and vinyl acetate. The type of thermal stabilizer which we there describe was a "tar base," consisting of the higher pyridine base homologs boiling above 240° C. at atmospheric pressure. In U. S. Patent 2,169,717, I have described another class of thermal stabilizers for the resinous vinyl polymers consisting of the quinoline and isoquinoline alkaloid bases, and particularly the cinchona alkaloid bases. In another copending application filed July 28, 1938, Serial No. 221,799, of which I am a co-inventor, a broader field of invention is claimed within which lie the inventions of U. S. Patents 2,130,924, 2,169,717.

I have now found that, by adding to the resinous polymeric vinylidene chloride compounds specifically described in the first section of this application a compound selected from the class consisting of the heterocyclic nitrogen bases containing side-chain substituents having at least one double bond which is conjugated with respect to a double-bonded nitrogen in the parent heterocyclic ring system, a coating material is produced that possesses greatly increased thermal stability. The ring substituted nitrogen bases containing conjugated double-bond systems so added my be used either in the form of pure compounds or as mixed concentrates, fractionated cuts, or basic residues derived from their synthetic preparation, or by extraction from heterocyclic nitrogen base containing natural products.

I have found that this increase in thermal stability is noticeable upon the addition of even a trace of the above type of stabilizer, and for practical utilization a quantity of stabilizer not exceeding 5 per cent of the weight of the resinous conjoint polymeric compound serves to impart such stability that films deposited from the thermally stabilized coating composition can be baked at temperatures exceeding 340–350° F. or higher without suffering any thermal decomposition. In the typical formulations to be described below I have usually specified that the stabilizer concentration be 2–5 per cent of the weight of the resinous conjoint polymeric compound. Concentrations of stabilizer in this range or even lower have been shown experimentally to yield stabilized solutions which can be baked on most metals at such temperature that maximum adhesion is developed without any thermal decomposition, and the coating possesses greatly increased gloss, toughness, and resistance to abrasion, moisture, atmospheric degradation, and other corrosive influences. Furthermore, with such stabilized coating composition it is possible to coat objects made from a plurality of dissimilar metals and thereafter to bake the coated object at a temperature such as will insure maximum adhesion to the most recalcitrant metal and without thermal decomposition of the coating on the other metals in the object.

I have described the type of heterocyclic nitrogen base stabilizers contemplated in my invention, in a general way. Specifically, I mean compounds of the pyridine, quinoline, and isoquinoline type, of the acridine type, of the pyrazine type, of the pyrazole type, of the thiopyrazole type, and (in general) heterocyclic bases containing at least one double-bonded ring nitrogen conjugated with a double bond outside the parent ring. Thus, I have found that the "tar bases," or higher pyridine base homologs (boiling above 240° C. at atmospheric pressure) that occur naturally in coal tar, natural asphalts, water-gas pitch, bone pitch, and other tarry materials will serve. I am able to add these tar bases either as isolated products, in the form of a purified pitchy wax containing the bases, or in the form of the crude pitch. Similarly, I have found that any compound selected from the class known as the quinoline and isoquinoline alkaloid bases, and particularly from the cinchona alkaloid bases, will serve. To quinoline and isoquinoline alkaloid bases constitute a particular subclass within the general class of heterocyclic nitrogen bases which I have found to serve as thermal stabilizers. Thus, I have employed with success isoquinine, hydroquinine, quinidine, cinchonine, cinchonidine, quinoidine, cinchona febrifuge, and crude apo-quinine bases. I have found none that is not serviceable to achieve thermal stabilization, and my experimentation indicates that all of the cinchona alkaloids, pure and impure, single and mixed, and their intermediate products of controlled decomposition by acid, such as quinicine, cinchonatoxine, isoquinotoxine and the like, are so serviceable. Finally, I have demonstrated that other miscellaneous heterocyclic bases, responding to the limitations defined above under my generalized description of the class of nitrogen base stabilizers, are also serviceable. Thus, I have employed with success tripyridyl, isopyrophthalone, alphapyridyl-o-hydroxy phenyl ethylene, stilbazole, alpha pyridyl furyl ethylene, alpha benzopyridyl-o-p-dihydroxy phenyl ethylene, and alpha pyrazyl-o-hydroxy-phenyl ethylene. I have found no compound responding to the generalized formula which I give below, which is not, in degree, serviceable.

A general formula for the type of stabilizing compounds contemplated is as follows:

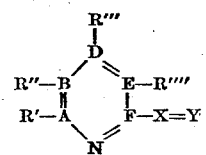

In the above formula N is nitrogen; X may be any tri- or tetra-valent element capable of entering into a double-bonded system, and typically may be carbon or nitrogen; Y may be any di-, tri-, or tetra-valent element capable of entering into a double-bonded system together with X, and typically may be carbon, nitrogen, or oxygen. R', R'', R''' and R'''' may be simply hydrogen, or any other aliphatic or aromatic hydrocarbon radical; similarly R' and R'', and R''' and R'''' may be joined together to form a condensed ring system, except in the special case when Y is oxygen. Further, A, B, D, E, and F typically may be carbon atoms, or one or more may be another element, such as nitrogen, capable of entering into a ring system and of bonding to side chains shown in the above generalized formula as R', R'', R''' and R''''. In a special case, oxygen or sulphur may be a member of the ring, in which case there will be no attached side group on that atom.

*Specific Examples*

(1) To 100 grams of the resinous vinylidene chloride polymer described above are added 5 grams of tripyridyl, and the whole brought into solution in a mixture consisting of 4 parts of dioxane and 1 part of toluol, the total concentration of solids being typically 15 per cent by weight of the whole. This stabilized coating compound may be spread upon tin plate, for example, at the usual coating thicknesses and thereafter baked at temperatures approximating 325° F. without noticeable thermal decomposition.

(2) To 100 grams of the resinous vinylidene chloride polymer described above, suitably dispersed in a solvent mixture consisting of 3 parts of dioxane, 1 part of methyl isobutyl ketone, and 1 part of toluol, at a concentration of 15 per cent solids, are added 5 grams of isopyrophthalone. This stabilized coating compound may be spread upon iron, for example, and thereafter baked at temperatures approximating 315° F. without noticeable thermal decomposition.

(3) To 100 grams of the resinous vinylidene chloride polymer described above, and dispersed in a solvent mixture consisting of 4 parts of mesityl oxide and 1 part of dioxane, are added 4 grams of alpha pyridyl-o-hydroxy phenyl ethylene. This stabilized coating compound may be spread upon tin plate, for example, and thereafter baked at temperatures approximating 330° F. without noticeable thermal decomposition.

(4) To 100 grams of the resinous vinylidene chloride polymer described above are added 3 grams of stilbazole, and the whole is then dispersed in a suitable solvent mixture, such as is described under Example 1. This stabilized coating compound may be spread upon iron, for example, and thereafter baked at temperatures approximating 310° F. without noticeable thermal decomposition.

(5) To 100 grams of the resinous vinylidene chloride polymer described above are added 3 grams of alpha pyridyl furyl ethylene, and the whole is then dispersed in a suitable solvent mixture, such as is described under Example 2. This stabilized coating compound may be spread upon copper, for example, and thereafter baked at temperatures approximating 380° F. without noticeable thermal decomposition.

(6) To 100 grams of the resinous vinylidene chloride polymer described above are added 4 grams of alpha benzopyridyl-p-chlorophenyl ethylene and the whole is then dispersed in a suitable solvent mixture, such as is described under Example 3. This stabilized coating compound may be spread upon zinc, for example, and thereafter baked at temperatures approximating 300° F. without noticeable thermal decomposition.

(7) To 100 grams of the resinous vinylidene chloride polymer described above are added 2 grams of quinicine, and the whole is then dispersed in a suitable solvent mixture, such as is described under Example 2. This stabilized coating may be spread upon tin plate, for example, and thereafter baked at temperatures approximating 330° F. without noticeable thermal decomposition.

(8) To 100 grams of the resinous vinylidene chloride polymer described above are added 2 grams of cinchonicine, and the whole is then dispersed in a suitable solvent mixture, such as is described under Example 2. This stabilized coating compound may be spread upon tin plate, for example, and thereafter baked at temperatures approximating 330° F. without noticeable thermal decomposition.

(9) To 100 grams of the resinous vinylidene chloride polymer may be added 5 grams of alpha pyrazyl-o-hydroxy phenyl ethylene, and the whole is then dispersed in a suitable solvent, such as is described under Example 1. This stabilized coating compound may be spread upon iron, for example, and thereafter baked at temperatures approximating 315° F. without noticeable thermal decomposition.

(10) To 100 grams of the resinous vinylidene chloride polymer described above may be added 1 gram of quinine, and the whole is then dispersed in a suitable solvent, such as mesityl oxide. This stabilized coating compound may be spread upon tin plate, for example, and thereafter baked at temperatures approximating 350° F. without noticeable thermal decomposition.

(11) To 100 grams of the resinous vinylidene chloride polymer described above may be added 2 grams of quinoidine, and the whole is then dispersed in a solvent mixture consisting of 4 parts of dioxane and 1 part of isophorone. This stabilized coating compound may be spread upon tin plate, for example, and thereafter baked at temperatures approximating 340° F. without noticeable thermal decomposition.

(12) To 100 grams of the resinous vinylidene chloride polymer described above may be added 2 grams of cinchona febrifuge, and the whole is then dispersed in a suitable solvent, such as isophorone, the total concentration of solids being typically 15 percent of the weight of the whole. This stabilized coating compound may be spread upon iron, for example, and thereafter baked at temperatures approximating 300° F. without noticeable thermal decomposition.

(13) To 100 grams of the resinous vinylidene chloride polymer described above may be added 2 grams of cinchonidine, and the whole is then dispersed in a solvent mixture consisting of 1 part of methyl ethyl ketone, 3 parts of dioxane, and 1 part xylene, the total concentration of solids being typically 18 per cent of the weight of the whole. This stabilized coating compound may be spread upon tinplate, for example, and thereafter baked at temperatures approximating 325° F. without noticeable thermal decomposition.

(14) To 100 grams of the resinous vinylidene chloride polymer described above may be added 5 grams of technical quinoline, and the whole dispersed in a suitable solvent mixture, such as is described under Example 11. This stabilized coating compound may be spread upon tinplate, for example, and thereafter baked at temperatures approximating 340° F. without noticeable thermal decomposition.

(15) To 100 grams of the resinous vinylidene chloride polymer described above may be added 2 grams of a coal tar pitch containing at least one tar base boiling above 240° C. at atmospheric pressure, and the whole is then dispersed in a typical solvent mixture consisting of 4 parts of dioxane, 1 part of xylene, and ⅕ part of dibutyl phthalate, the total concentration of solids being typically 18 per cent of the weight of the whole. This stabilized coating compound may be spread upon tinplate, for example, and thereafter baked at temperatures approximating 340° F. without noticeable thermal decomposition.

(16) To 100 grams of the resinous vinylidene chloride polymer described above may be added 5 grams of natural asphalt, and the whole is then dispersed in a solvent mixture consisting of 2 parts of mesityl oxide, 2 parts of isophorone, 1 part of hiflash naphtha and ⅕ part of dibutyl cellosolve phthalate, the total concentration of solids being typically 15 per cent of the weight of the whole. This stabilized coating compound may be spread upon tinplate, for example, and thereafter baked at temperatures approximating 350° F. without noticeable thermal decomposition.

(17) To 100 grams of the resinous vinylidene chloride copolymer described above may be added 5 grams of "tar wax," being a waxy commercial extract of the higher tar bases occurring in coal tar pitch. The whole is then dispersed in a solvent mixture consisting of 5 parts of dioxane and ⅕ part of liquid chlorinated diphenyl, the total concentration of solids being typically 20 per cent of the weight of the whole. This stabilized coating compound may be spread upon tinplate, for example, and thereafter baked at temperatures approximating 350° F. without noticeable thermal decomposition.

(18) To 100 grams of the resinous vinylidene chloride polymer described above may be added 3 grams of water-gas pitch, and the whole brought into solution in a suitable solvent mixture, such as is described in Example 17. This stabilized coating compound may be spread upon iron, for example, and thereafter baked at temperatures approximating 320° F. without noticeable thermal decomposition.

(19) To 100 grams of the resinous vinylidene chloride polymer described above may be added 5 grams of coal tar pitch, and the whole brought into solution in a solvent mixture which may consist of 3 parts of dioxane, 1 part of isophorone, 1 part of methyl normal propyl ketone, ½ part of hiflash naphtha and ⅕ part of tricresyl phosphate. The total concentration of solids may be typically 18 per cent of the whole. This stabilized coating compound may be spread upon tinplate, for example, and thereafter baked at temperatures approximating 350° F. without noticeable thermal decomposition.

In the above examples I have given typical stabilized coating compositions, and it will be understood that the concentrations of stabilizer specified may be preferred concentrations but are not limiting concentrations. If crude pitches or pitch-derived waxes be employed, they should be used in proportion to their content in cyclic nitrogen base compounds. It may be explained that in the case of crude pitch, and pitch-derived waxes, a large proportion of the content constitutes for my purpose merely a pitch diluent for the tar base or bases supplied to the coating. For reasons of availability, however, it may be desirable, under certain circumstances, to utilize a crude pitch or pitch-derived wax, rather than to add technical quinoline or other cyclic nitrogen bases in separated or purified condition.

As an alternative to admixture of the thermal stabilizing material to the polymeric vinylidene chloride resin in solution, it may in any of its forms be milled in with the solid resin. Quantitatively, there is no fixed upper limit to the percentage inclusion of the thermal stabilizer with the polymeric vinylidene chloride resin. Within reasonable limits, it is a fact that the increase in thermal stability attendant upon its use is proportional to the amount of stabilizer added. There are, of course, practical limits to the inclusion of the stabilizer in any of its forms. Thus it is obvious that the coal tar pitch, for example, should not be included in such proportion that the coating becomes a pitchy coating rather than a resin film, and it is equally true that there would be no advantage in attempting to carry the endurable temperature to such point that the thermal stabilizing agent would itself decompose.

Having described fully my discovery, and having shown the advantages attendant with its use, I claim as my invention:

1. A thermally stabilized coating compound consisting of a polymer derived from the polymerization of vinylidene chloride, and a stabilizer consisting of a pitch containing at least one tar base boiling above 240° C. at atmospheric pressure, such tar base being present in a ratio not to exceed 5 parts of tar base to 100 parts of the first named substance, the whole being dispersed in a mixture of suitable solvents.

2. A thermally stabilized coating compound consisting of a conjoint polymer derived from the simultaneous polymerization of vinylidene chloride and vinyl chloride, and a stabilizer consisting of quinoidine, such stabilizer being present in a ratio not to exceed 5 parts of quinoidine to 100 parts of the first named substance, the whole being dispersed in a mixture of suitable solvents.

3. A thermally stabilized coating compound consisting of a conjoint polymer of vinylidene chloride and ethyl acrylate, and a stabilizer consisting of isopyrophthalone, such stabilizer being present in a ration not to exceed 5 parts of isopyrophthalone to 100 parts of the first named substance, the whole being dispersed in a mixture of suitable solvents.

4. A thermally stabilized coating compound consisting of a polymer of vinylidene chloride and a stabilizer consisting of a heterocyclic nitrogen base in which the ring includes at least one double-bonded nitrogen conjugated with a double bond not within the ring, of the general formula $-N=C-X=Y$ in which $-N=C-$ is included in the heterocyclic ring, wherein X is selected from a group consisting of carbon and nitrogen, and Y is selected from a group consisting of carbon, nitrogen, and oxygen, such stabilizer being present in a ratio not to exceed 5 parts of stabilizer to 100 parts of the first named substance.

5. A thermally stabilized coating compound consisting of a polymer of vinylidene chloride and a stabilizer consisting of quinoidine, such stabilizer being present in a ratio not to exceed 5 parts of stabilizer to 100 parts of the first named substance, and the whole disepersed in a solvent mixture.

6. A thermally stabilized coating compound consisting of polyvinylidene chloride, and a stabilizer consisting of a pitch containing at least one tar base boiling above 240° C. at atmospheric pressure, such tar base being present in a ratio not to exceed 5 parts of tar base to 100 parts of the first-named substance, the whole being dispersed in a mixture of suitable solvents.

GEORGE H. YOUNG.